(12) United States Patent
Machida et al.

(10) Patent No.: US 6,508,234 B2
(45) Date of Patent: Jan. 21, 2003

(54) FUEL INJECTION CONTROL SYSTEM FOR ENGINE

(75) Inventors: Kenichi Machida, Saitama (JP); Yoshiaki Hirakata, Saitama (JP); Toru Takeda, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/126,696

(22) Filed: Apr. 22, 2002

(65) Prior Publication Data

US 2002/0170541 A1 Nov. 21, 2002

(30) Foreign Application Priority Data

May 21, 2001 (JP) ........................................ 2001-151070

(51) Int. Cl.[7] .............................................. F02M 51/00
(52) U.S. Cl. ...................................... 123/478; 123/480
(58) Field of Search ................................ 123/478, 480, 123/488, 445, 299

(56) References Cited

U.S. PATENT DOCUMENTS 5,701,871 A * 12/1997 Munakata et al. .......... 123/480

FOREIGN PATENT DOCUMENTS

| JP | 5-340285 A | 12/1993 |
| JP | 6-102999 B2 | 12/1994 |
| JP | 7-247892 A | 9/1995 |

* cited by examiner

Primary Examiner—Bibhu Mohanty
(74) Attorney, Agent, or Firm—Birch, Stewart, Kolasch & Birch, LLP

(57) ABSTRACT

A required fuel amount for an engine is calculated at a predetermined calculation cycle. A fuel injection amount to be injected from an upstream injection valve and a fuel injection amount to be injected from a downstream injection valve are then calculated. After fuel injection on the basis of the calculated fuel injection amounts, a lack of fuel delivered by the fuel injection amounts immediately before re-calculation of a required fuel amount at the calculation cycle until the end of an intake stroke (end of an intake valve opening period), is calculated by subtracting the fuel injection amounts from the re-calculated required fuel amount. The calculated lack of fuel amount is injected from the downstream injection valve during the intake stroke, e.g., in stages 6 and 7. A portion of a fuel injected from each of the fuel injection valves which has adhered on an inner wall of an intake pipe and subsequently released to be later supplied to the engine, is calculated in accordance with a predetermined adhesion ratio and a predetermined release ratio. The above lack of fuel amount is determined in consideration of the calculated portion of the fuel. The lack of fuel amount is additionally injected, e.g. a fuel correction amount, even during an engine transient state, and engine operability and fuel consumption are improved.

16 Claims, 9 Drawing Sheets

FUEL INJECTION CONTROL SYSTEM FOR ENGINE

CROSS-REFERENCES TO RELATED APPLICATIONS

This nonprovisional application claims priority under 35 U.S.C. §119(a) on patent application No. 2001-151070 filed in Japan on May 21, 2001, the entirety of which is herein incorporated by reference.

BACKGROUND OF THE INVENTION

1. Field of the Invention

The present invention relates to a fuel injection control system for an engine, and more particularly to a fuel injection control system for an engine capable of estimating a portion of a fuel injected from a fuel injection valve that is not directly supplied to a cylinder because of adhesion along an inner wall of an intake pipe or the like. Accordingly, adequate fuel injection on the basis of this estimated result is realized with the present invention.

2. Description of the Background Art

Control systems for engines in which fuel injection valves are disposed in the upstream and the downstream of a throttle valve have been known in the background art. For example, a similar control system is described in Japanese Patent Laid-open No. Hei 6-102999. This control system is configured such that a fuel is injected, in an idle rotation region, only from a downstream side fuel injection valve. Fuel is injected, in a region other than the idle rotation region, from an upstream side fuel injection valve in accordance with an engine operation state.

In this type of control unit, when the control unit operates in a region other than the idle rotation region, a fuel amount injected from the downstream side injection valve is gradually reduced to a target value. The fuel amount injected from the downstream side injector is determined in consideration of the residual portion of a fuel injected from the upstream side injection valve. The residual portion adheres on a wall surface of an intake pipe.

Fuel injection control systems for engines having a single fuel injection valve, in which a fuel injection amount is corrected in consideration of fuel adhering on an inner wall of an intake pipe, have been proposed in the background art. For example, in Japanese Patent Laid-open Nos. Hei 7-247892 and Hei 5-340285 single fuel injection valve systems are described. In particular, the control system in the latter document discloses controlling repeated fuel injection (divided injection), i.e., twice in one cycle.

According to the control system described in Japanese Patent Laid-open No. Hei 6-102999, although adhesion of a fuel on the wall surface in the upstream of the throttle valve is taken into account, it fails to examine an amount of the fuel adhering on the wall surface along the lower and remaining surfaces. Accordingly, the control system does not realize high, accurate control so as to meet a target air-fuel ratio. It is therefore difficult to improve drivability (running performance) in combination with the desired improvement of fuel consumption. Another problem of this control system is that since the number of setting parameters is increased to improve responsiveness to a change in engine state, or a change in throttle opening angle, the control of fuel injection becomes complex.

The fuel injection control system for an engine including a single fuel injection valve estimates a fuel adhesion amount specified for an engine including a single fuel injection valve. The control system does not control fuel individually in an engine including fuel injection valves disposed in the upstream and downstream of the throttle valve. Accordingly, the control systems of the background art do not estimate a fuel adhesion amount in each of the upstream and downstream positions with respect to the throttle valve in an engine including fuel injection valves disposed in both the upstream and downstream positions.

As described in the above document, Japanese Patent Laid-open No. Hei 6-102999, the calculation of a fuel injection amount is generally performed at each predetermined crank angle (at each crank angle of 180° in the control system of this document). Fuel is injected front each fuel injection valve at a rate of once per cycle (crank angle: 720°).

Accordingly, if an engine state is changed before a point of fuel injection and after calculation of a fuel injection amount is calculated, the fuel injection amount once determined cannot be changed. As a result, in an acceleration state in which the engine state is changed rapidly and/or significantly, the amount of fuel supplied may be lacking to the point of degrading drivability and/or engine operability. In particular, if a throttle opening angle is changed significantly, it is unclear to what degree a fuel injected from an upstream injection valve flows in the downstream of the throttle valve, with a result that over-rich or over-lean engine operation is liable to occur. The entirety of each of the foregoing references described in the Description of the Background Art of the present application are hereby incorporated by reference into the present application.

SUMMARY OF THE INVENTION

The present invention overcomes the shortcomings associated with the background art and achieves other advantages not realized by the background art.

An object of the present invention is to provide a fuel injection control system for an engine capable of accurately determining an amount of fuel supplied in response to a current engine state on the basis of a fuel flow-in state from a position upstream of a throttle valve.

These and other aspects of the present invention are accomplished by a fuel injection control system for an engine comprising a throttle valve; at least one upstream injection valve being,disposed in an upstream position with respect to the throttle valve; at least one downstream injection valve being disposed in a downstream position with respect to the throttle valve; means for calculating a required fuel amount for a predetermined calculation cycle and calculating actual fuel amounts to be injected during a fuel injection process from the upstream injection valve and the downstream injection valve on the basis of the required fuel amount; and means for calculating, after the fuel injection process, a lack of fuel amount immediately before recalculating a recalculated required fuel amount at the calculation cycle coming at the end of an intake stroke, the lack of fuel amount being calculated by subtracting the required and the actual fuel amounts from the recalculated required fuel amount.

These and other aspects of the present invention are further accomplished by a method of calculating a fuel injection amount for a cylinder using the foregoing system, the method comprising calculating a fuel injection amount of at least one of the upstream fuel injection valve and the downstream fuel injection valve according to a respective fuel pressure of the upstream fuel injection valve and the downstream fuel injection valve; and controlling a fuel injection time period to control the fuel injection amount.

These and other aspects of the present invention are further accomplished by a fuel injection control system for an engine including a fuel injection valve, the fuel injection control system comprising means for calculating a required fuel amount during a predetermined calculation cycle and for calculating a injected fuel amount to be injected from the fuel injection valve on the basis of the required fuel amount; means for calculating, after a fuel injection of a fuel from the fuel injection valve on the basis of the calculated injected fuel amount, a lack of fuel amount immediately before a re-calculation of a required fuel amount during the calculation cycle at the end of an intake stroke, the lack of fuel amount being calculated by subtracting the calculated injected fuel amount from the re-calculated required fuel amount; the lack of fuel amount being additionally injected during the intake stroke; the lack of fuel injection amount being calculated by addition of a fuel injected from the fuel injection valve and deposited on an inner wall of an intake pipe to achieve a first amount, and subtracting a fuel released from the deposited fuel to flow into an engine cylinder from the first amount.

These and other aspects of the present invention are further accomplished by a fuel injection control system for an engine comprising at least one engine cylinder; a throttle valve; at least one upstream injection valve being disposed in an upstream position with respect to the throttle valve; at least one downstream injection valve being disposed in a downstream position with respect to the throttle valve; a direct fuel flow calculating unit; an indirect fuel flow calculating unit; a downstream fuel calculating unit, the downstream fuel calculating unit outputting a combined fuel flow from the upstream position and the downstream injection valve; a downstream direct fuel flow calculating unit; a downstream indirect fuel flow calculating unit; an adding unit, the adding unit outputting an actual fuel amount to the cylinder; and a comparison unit, the comparison unit calculating a lack of fuel amount immediately before recalculating a recalculated required fuel amount at a calculation cycle coming at the end of an intake stroke of the cylinder, the lack of fuel amount being calculated by subtracting a sum of a required fuel amount and the actual fuel amount from the recalculated required fuel amount.

These and other aspects of the present invention are further accomplished by a method of calculating a fuel injection amount for a cylinder using the foregoing system, the method comprising calculating a fuel injection amount of at least one of the upstream fuel injection valve and the downstream fuel injection valve; and controlling a fuel injection time period to control the fuel injection amount.

With a first feature of the present invention, after a fuel based on a required fuel amount calculated at a predetermined cycle is injected, any fuel deficit from the previous fuel injection can be calculated and additionally injected up until the end of the intake stroke.

With second and third features of the present invention, the lack of fuel injection amounts can be accurately detected by estimating the amount of a fuel supplied not directly, but indirectly from each fuel injection valve to the engine in accordance with the predetermined adhesion ratio and the predetermined release ratio.

With a fourth feature of the present invention, the lack of fuel injection amount can be accurately detected by calculating a portion of a fuel injected from the fuel injection valve. This portion directly flows into the cylinder. A second portion of the fuel injected from the fuel injection valve, which part has been deposited on the inner wall of the intake pipe, and is subsequently released to indirectly flow into the cylinder, makes up the additional fuel that can be supplied to the engine with the first portion, e.g. a total fuel amount.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
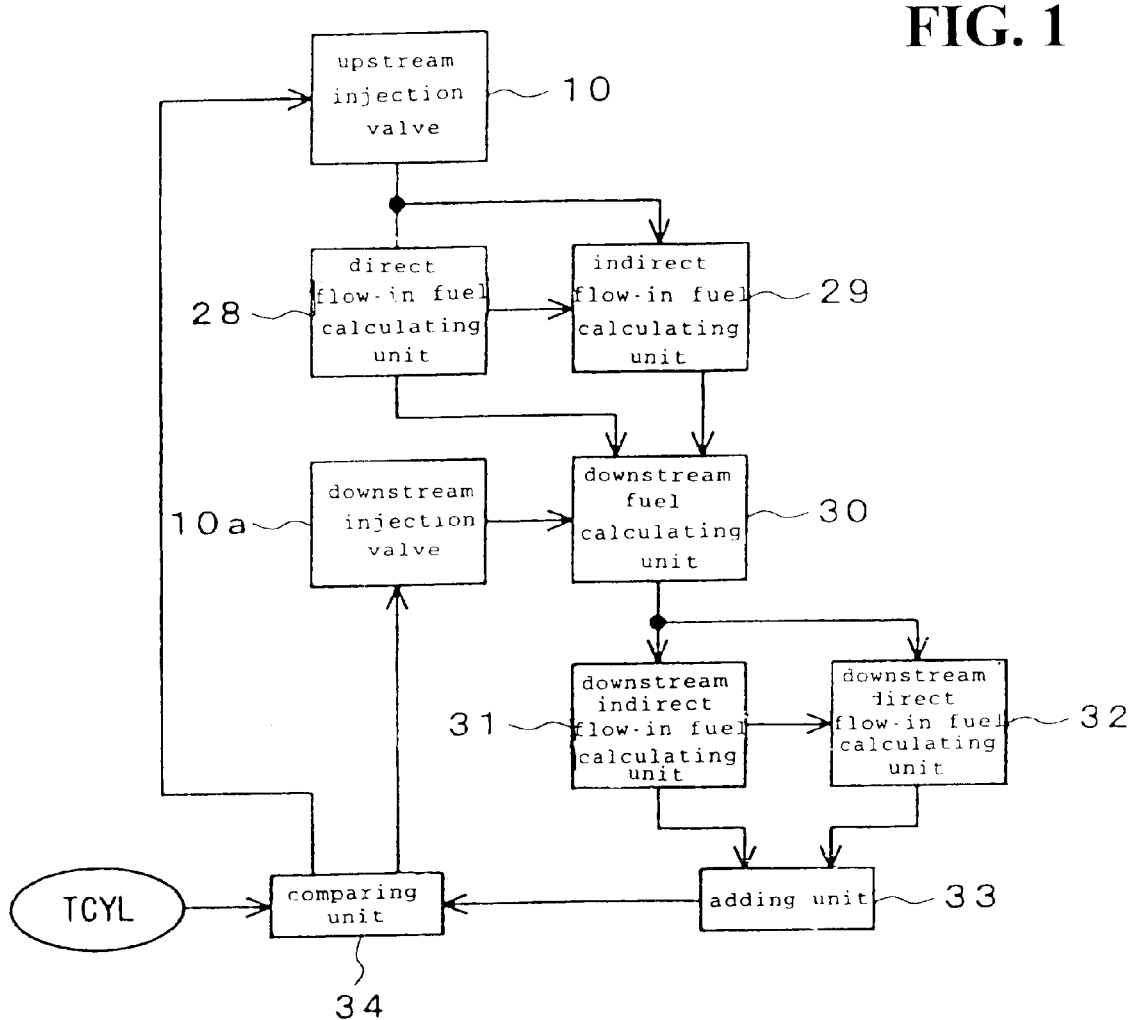
FIG. 1 is a block diagram showing functions of a fuel injection control system according to an embodiment of the present invention.
Figure 2:
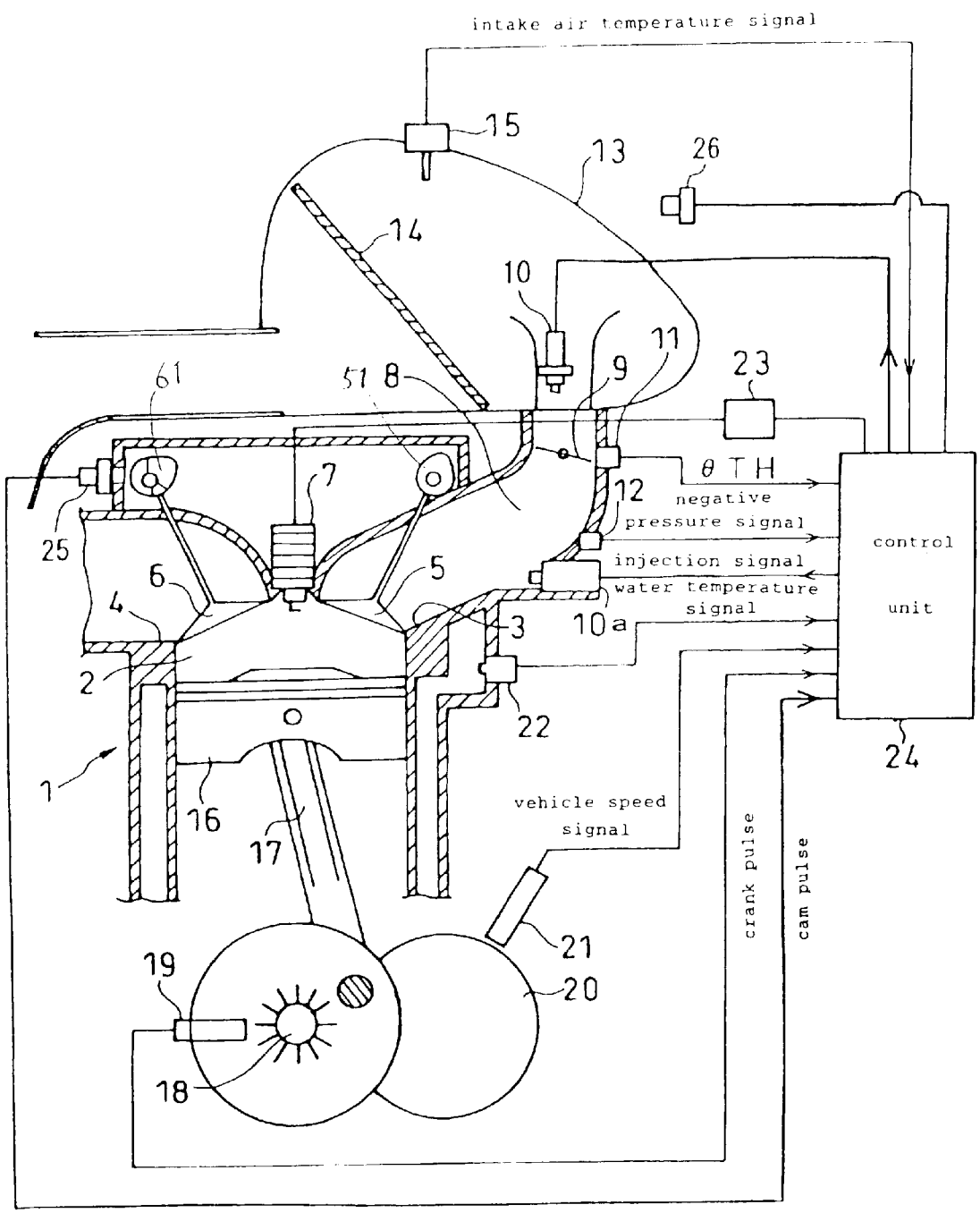
FIG. 2 is a schematic view showing a configuration of a portion of an engine including the fuel injection control system of the present invention.
Figure 3:
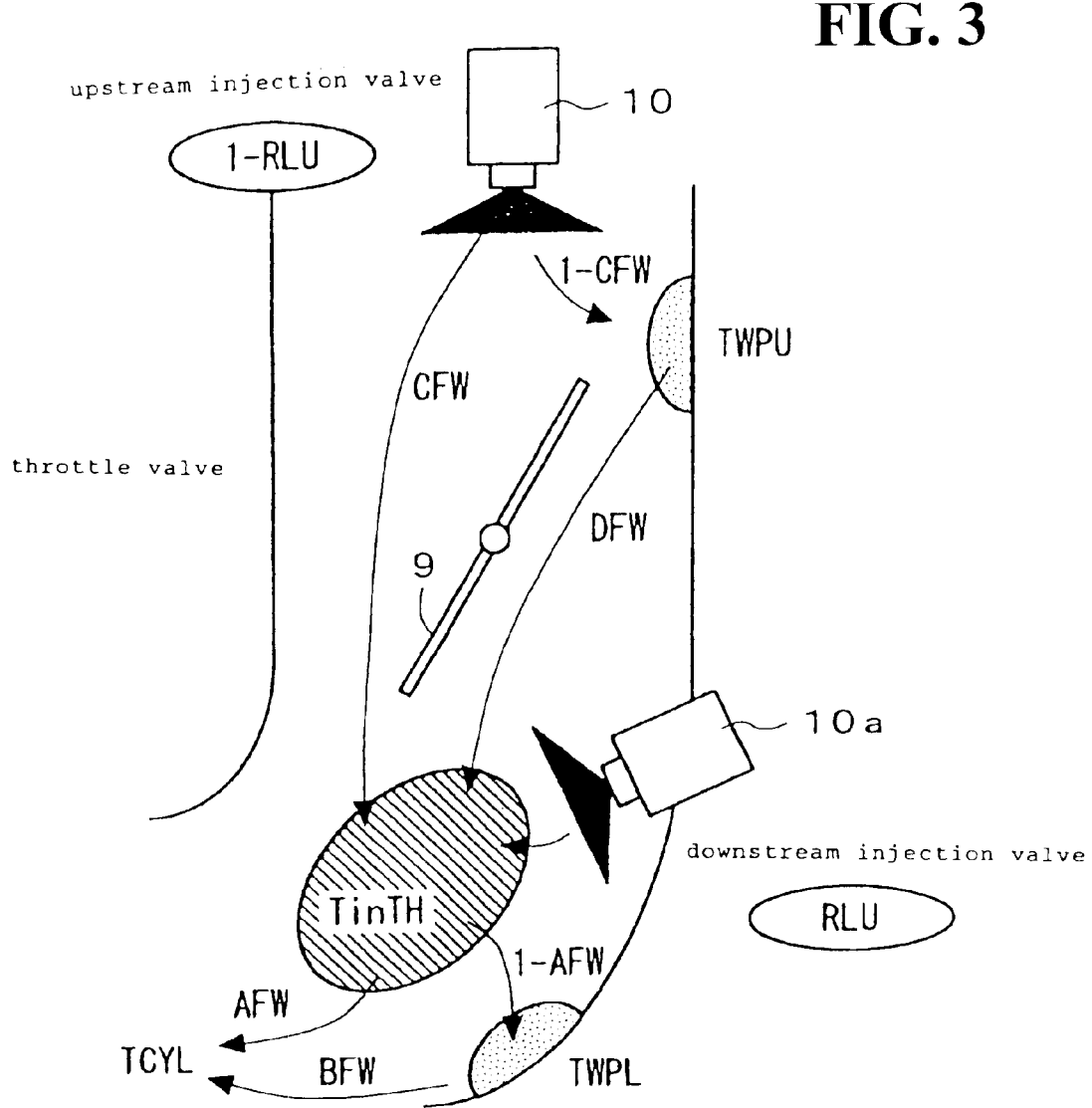
FIG. 3 is a schematic view of a throttle body showing a dynamic model of a fuel injected into an intake passage.
Figure 4:
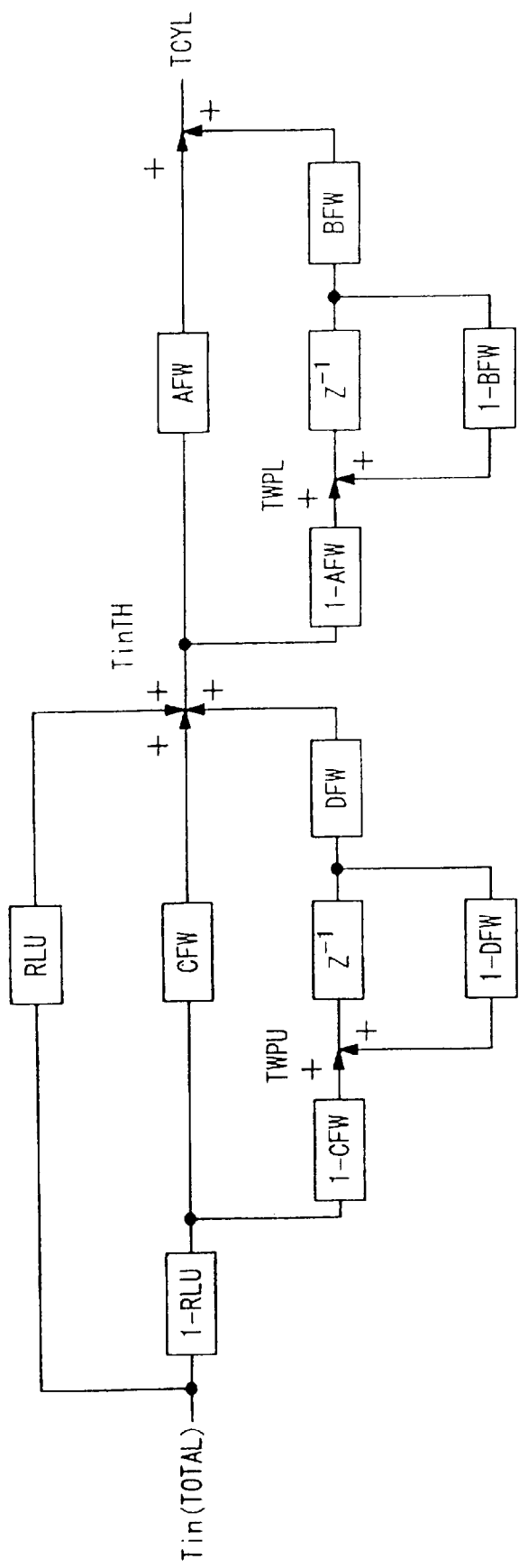
FIG. 4 is a block diagram showing a dynamic mode in the vicinity of a throttle valve.
Figure 5:
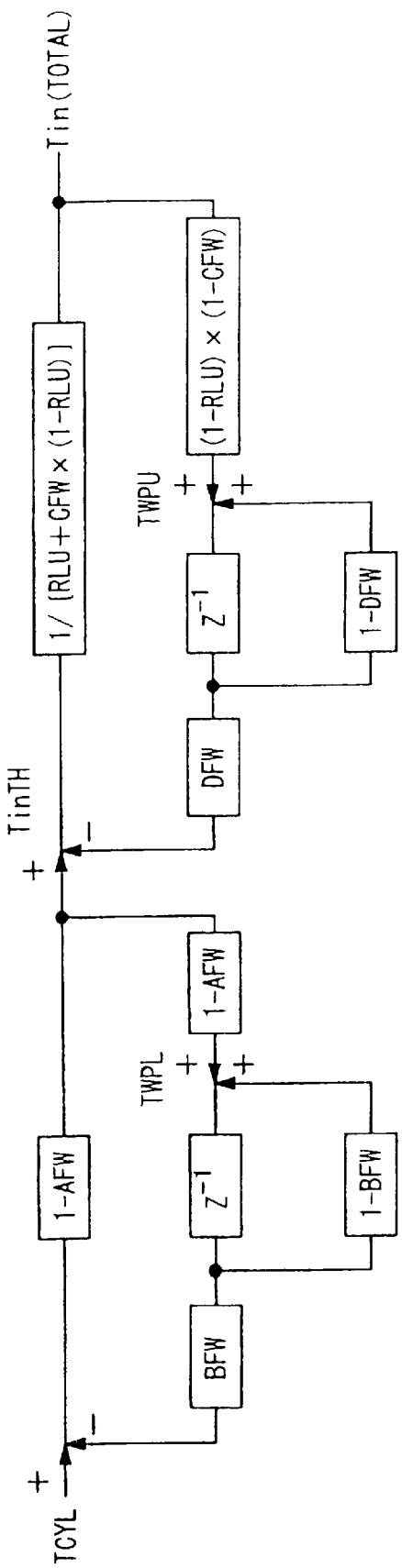
FIG. 5 is a block diagram showing a calculation function for calculating fuel injection amounts by injection valves.
Figure 6:
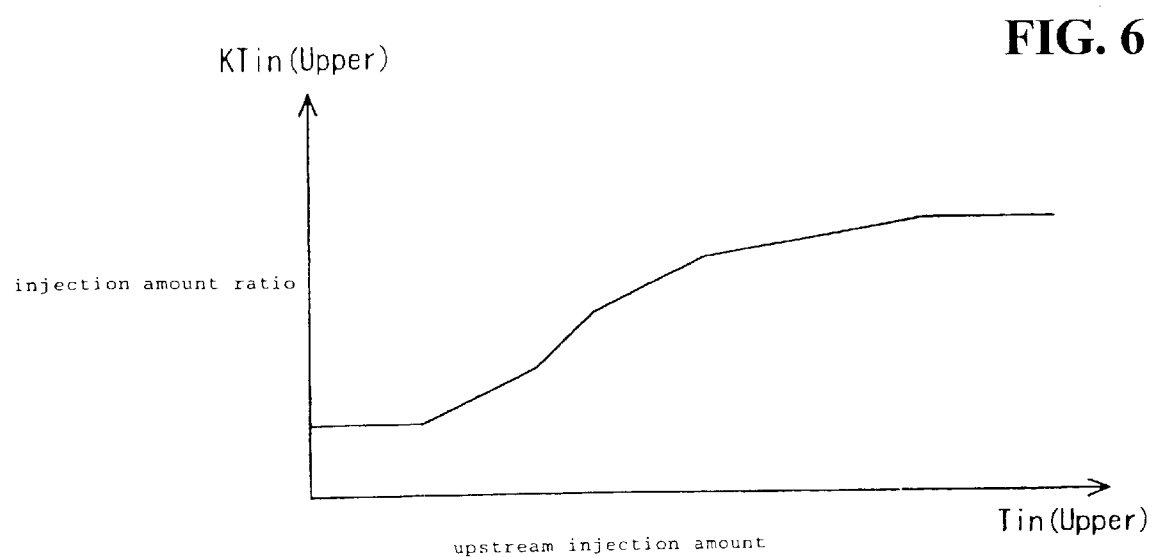
FIG. 6 is a table in which a relationship between a fuel injection amount ratio KTin(Upper) and an upstream injection amount Tin(Upper) is set.
Figure 7:
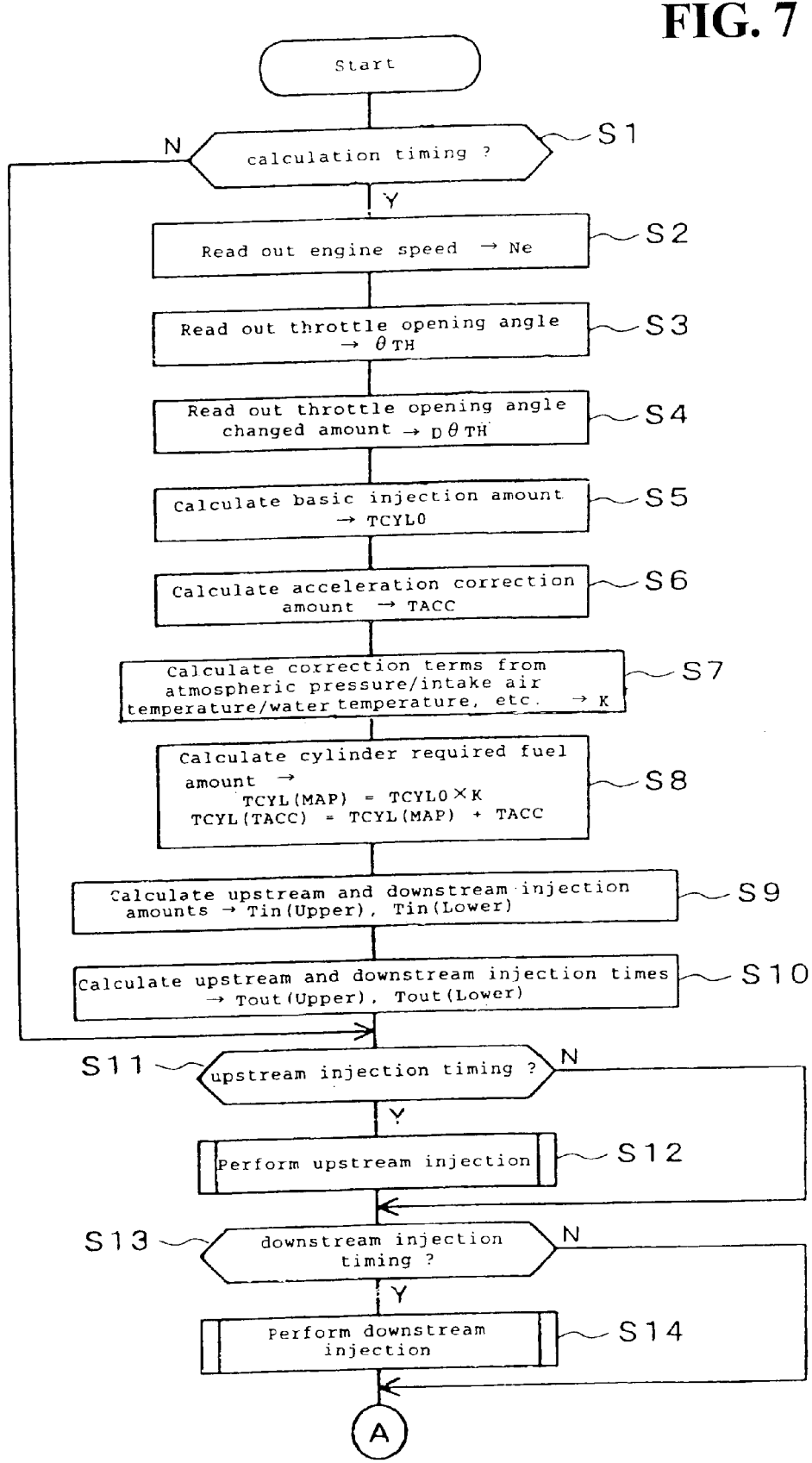
FIG. 7 is a flow chart (Part 1) showing a process of fuel injection control.
Figure 8:
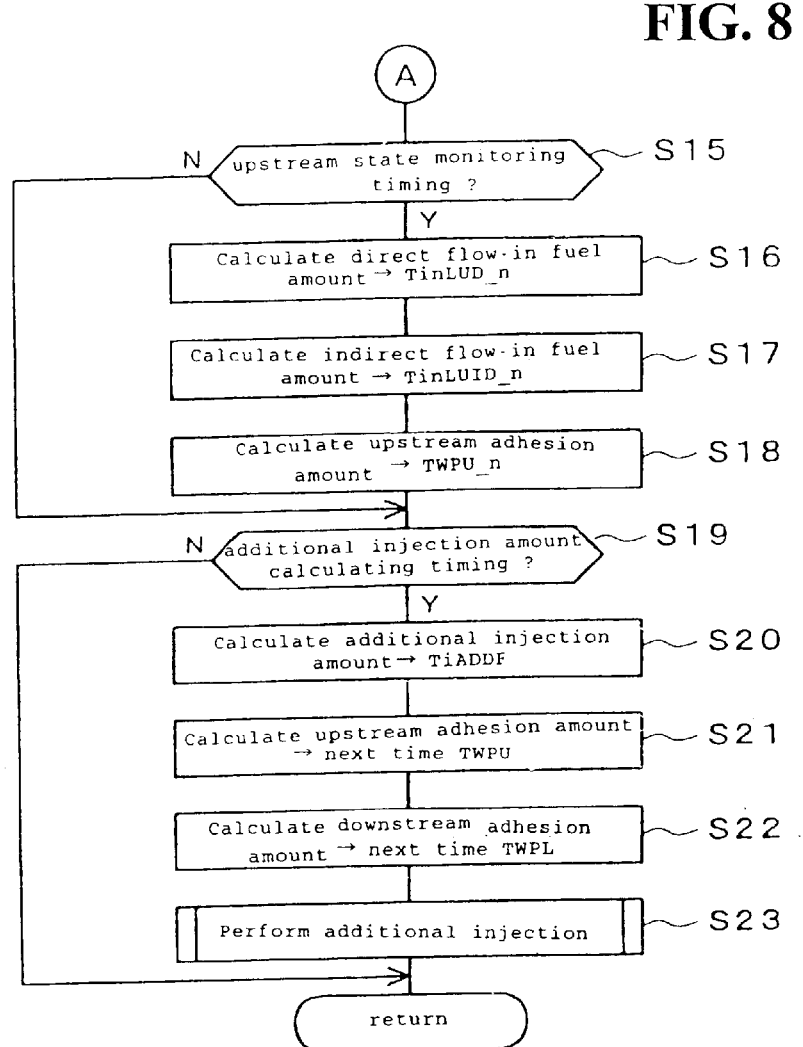
FIG. 8 is a flow chart (Part 2) showing the process of fuel injection control.
Figure 9:
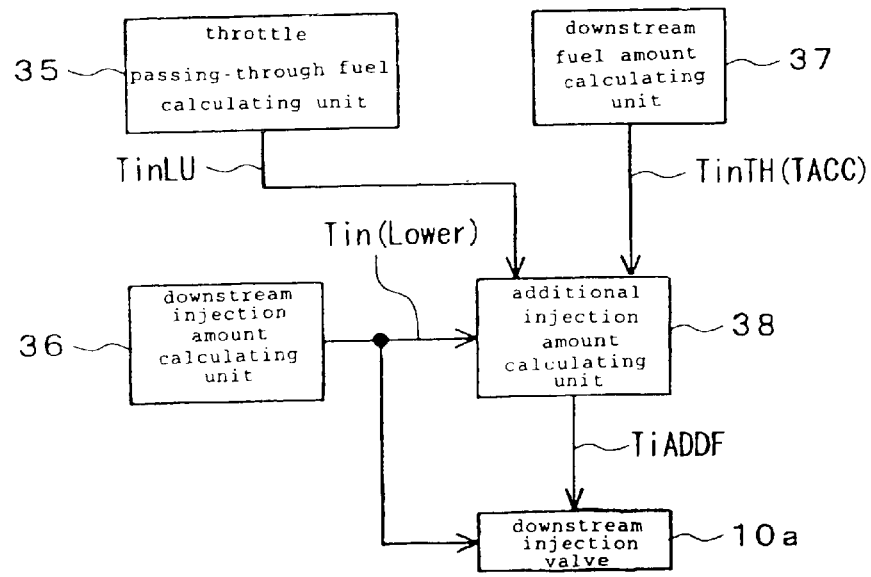
FIG. 9 is a block diagram showing functions of portions, for calculating an additional fuel amount, of the fuel injection control system according to an embodiment of the present invention.
Figure 10:
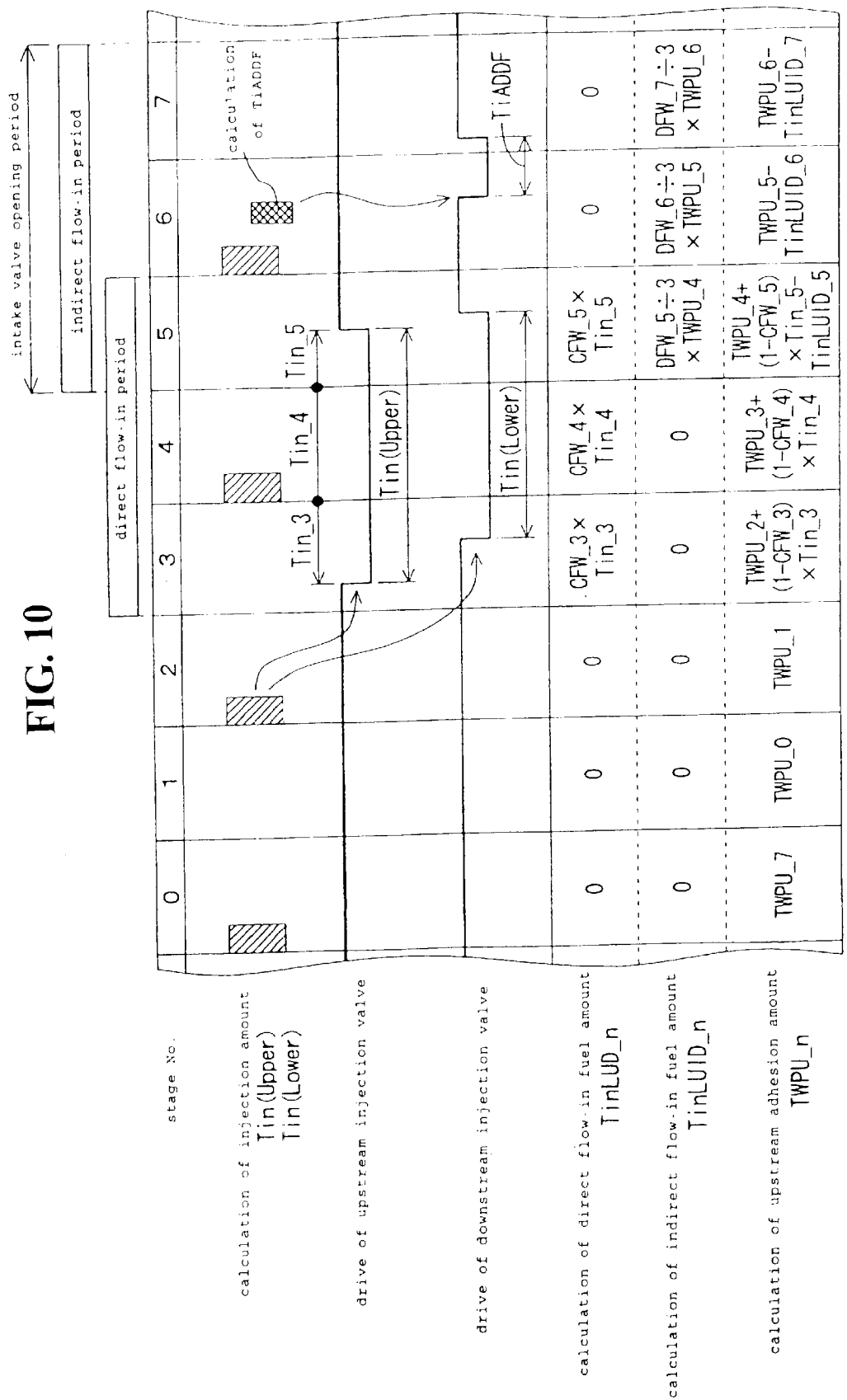
FIG. 10 is a timing chart showing calculated fuel injection times and fuel injection timings.

The present invention will hereinafter be described with reference to the accompanying drawings. FIG. 1 is a block diagram showing functions of a fuel injection control system according to an embodiment of the present invention. FIG. 2 is a schematic view showing a configuration of a portion of an engine including the fuel injection control system of the present invention. FIG. 3 is a schematic view of a throttle body showing a dynamic model of a fuel injected into an intake passage. FIG. 4 is a block diagram showing a dynamic mode in the vicinity of a throttle valve. FIG. 5 is a block diagram showing a calculation function for calculating fuel injection amounts by injection valves. FIG. 6 is a table in which a relationship between a fuel injection amount ratio KTin(Upper) and an upstream injection amount Tin(Upper) is set. FIG. 7 is a flow chart (Part 1) showing a process of fuel injection control. FIG. 8 is a flow chart (Part 2) showing the process of fuel injection control. FIG. 9 is a block diagram showing functions of portions, for calculating an additional fuel amount, of the fuel injection control system according to an embodiment of the present invention. FIG. 10 is a timing chart showing calculated fuel injection times and fuel injection timings.

FIG. 2 is a schematic view showing a configuration of a portion of an engine including the fuel injection control system of the present invention. Referring to FIG. 2, an intake port 3 and an exhaust port 4 are opened in a combustion chamber 2 of a cylinder 1. An intake valve 5 is provided for the intake port 3 and an exhaust valve 6 is provided for the exhaust port 4. An ignition plug 7 is provided for the combustion chamber 2. An ignition coil 23 is connected to the ignition plug 7.

An intake passage 8 in communication with the intake port 3 is provided with a throttle valve 9 for adjusting an intake air amount on the basis of a throttle opening angle θTH. A fuel injection valve 10 (hereinafter, referred to as "upstream injection valve") is provided on the upstream side from the throttle valve 9 and a second fuel injection valve 10a (hereinafter, referred to as "downstream injection valve") is provided on the downstream side from the throttle valve 9.

A throttle sensor 11 for detecting the throttle opening angle θTH and a negative pressure sensor 12 are also provided. An air cleaner 13 is provided at a terminal end of the intake passage 8 and an air filter 14 is provided in the air cleaner 13. Outside air is sucked into the intake passage 8 through the air filter 14. An intake air temperature sensor 15 is provided in the air cleaner 13.

A piston 16 is provided in the cylinder 1, and a crankshaft 18 is connected to the piston 16 via a connecting rod 17. A crank angle sensor 19 for detecting a rotational angle of the crankshaft 18 and outputting a crank pulse for each specific crank angle is disposed in such a manner as to face to the crankshaft 18. A vehicle speed sensor 21 is disposed in such a manner as to face toward a rotating body 20 such as a gear that is connected to the crankshaft 18 and rotated together therewith.

Cams 51 and 61 are provided for opening/closing the intake valve 5 and the exhaust valve 6, respectively. The cams 51 and 61 are rotated by a rotational force transmitted from the crankshaft 18 via a gear train (not shown). A cam angle sensor 25 for detecting a rotational angle position is provided in such a manner as to face to the cam 61. A water temperature sensor 22 for detecting a cooling water temperature representative of an engine temperature is provided on a water jacket formed around the cylinder 1. An atmospheric pressure sensor 26 is provided at a suitable position.

A control unit 24, e.g., a micro-computer including a CPU or a memory, includes input/output ports, and an interface such as an A/D converter. A power source for operating the control unit 24 is supplied, e.g. from a battery (not shown), to the control unit 24. An output of each of the above-described sensors is inputted into the control unit 24 through the input port.

On the basis of the results of processing input signals supplied from the sensors, the control unit 24 outputs drive signals to the upstream and downstream injection valves 10 and 10a and the ignition plug 7. A drive signal (injection signal) outputted to each of the upstream and downstream injection valves 10 and 10a is a pulse signal having a pulse width corresponding to an injection amount. Each of the upstream and downstream injection valves 10 and 10a is opened for a time corresponding to the pulse width of the pulse signal, e.g. to inject a fuel in the intake passage 8 in response thereto.

With respect to the fuel injected from each of the upstream and downstream injection valves 10 and 10a, all of the fuel is not directly supplied to the combustion chamber 2. Instead, a part of the fuel adheres on an inner wall of the intake passage 8 and is then supplied to the combustion chamber 2 therefrom. In some cases, the fuel which has been injected from the upstream injection valve 10 and which has adhered on a portion of the inner wall of the intake passage 8 in the upstream of the throttle valve 9 adheres to a portion downstream of the throttle valve 9. The portion downstream of the throttle valve 9 is along the inner wall of the intake passage 8. The fuel that adheres to both portions is then supplied to the combustion chamber 2, including the fuel introduced by the downstream fuel injection valve 10a.

According to this embodiment, a wall surface fuel adhesion amount in the downstream of the throttle valve 9 and a wall surface fuel adhesion amount in the upstream of the throttle valve 9 are estimated, and respective fuel amounts to be injected from the upstream and downstream injection valves 10 and 10a are calculated in consideration of the estimated wall surface fuel adhesion amounts. Specifically, the fuel amounts to be injected from the upstream and downstream injection valves 10 and 10a are calculated by using adhesion ratios and release ratios.

The adhesion ratios are used for estimating the wall surface fuel adhesion amounts in the upstream and downstream of the throttle valve 9. The release ratios are each determined as a ratio of a fuel released from a deposited fuel having adhered on the wall surface and flowing downstream therefrom to the deposited fuel having adhered on the wall surface. Each of these adhesion ratios and release ratios is a function of an engine state, e.g., a function of the throttle opening angle θTH and an engine speed Ne, and is previously set by calculation based on experimental results.

FIG. 3 is a schematic view of the throttle valve 9 and its vicinity, e.g. a throttle body, illustrating a dynamic mode of a fuel injected into the intake passage 8. Referring to FIG. 3, a fuel amount supplied from each of the upstream and downstream injection valves 10 and 10a is controlled in such a manner that a fuel amount "TCYL" agrees with a total required fuel amount Tin. The total required fuel amount Tin provided by the upstream and downstream injection valves 10 and 10a is taken as "1," and an injection ratio of a fuel supplied from the downstream injection valve 10a in the cylinder 1 to the total required fuel amount Tin (which ratio is referred to as "downstream injection ratio") is taken as "RLU." Based on such an assumption, an injection ratio of a fuel supplied from the upstream injection valve 10 in the cylinder 1 to the total required fuel amount Tin (which ratio is referred to as "upstream injection ratio") becomes "1-RLU."

It is also assumed that a ratio of a fuel directly transferred downstream of the throttle valve 9 to a total fuel amount injected from the upstream injection valve 10 (which ratio is referred to as "upstream direct ratio") is taken as "CFW". On such an assumption, a ratio of a fuel adhering on the wall surface in the upstream of the throttle valve 9 to the total fuel amount injected from the upstream injection valve 10 (which ratio is referred to as "adhesion ratio") is defined as an upstream adhesion ratio "1-CFW".

The fuel directly supplied from the upstream injection valve 10 downstream of the throttle valve 9 at the upstream direct ratio "CFW" and the fuel having adhered on the upstream wall surface and then released from the wall surface to be indirectly supplied downstream are supplied together with a fuel injected from the downstream injection valve 10a. Here, a ratio of a fuel released from the wall surface to be supplied in the downstream to the fuel supplied in the downstream from the upstream injection valve 10 (which is referred to as "release ratio") is defined as an upstream indirect ratio "DFW."

The fuel having been delivered therein directly or indirectly from the upstream injection valve 10 and a fuel injected from the downstream injection valve 10a commingle downstream of the throttle valve 9. This total fuel amount is defined as a downstream fuel amount TinTH. Of this downstream fuel amount TinTH, a fuel directly transferred into the intake port 3 is calculated by using a downstream direct ratio "AFW," and a fuel adhering on the wall surface downstream of the throttle valve 9 is calculated by using an "adhesion ratio" defined as a downstream adhesion ratio "1-AFW."

A fuel having adhered on the upstream wall surface, e.g., an upstream adhesion amount, is defined as "TWPU", and a fuel having adhered on the downstream wall surface, e.g., a downstream adhesion amount is defined as "TWPL." Of the downstream adhesion amount "TWPL," a ratio of a fuel supplied on the intake port 3 side (which is referred to as "release ratio") is defined as a downstream indirect ratio "BFW." A fuel amount calculated on the basis of the downstream direct ratio "AFW" and the downstream indirect ratio "BFW" is the fuel amount "TCYL" supplied to the cylinder 1. Fuel amounts supplied from the upstream and downstream injection valves 10 and 10a are controlled in such a manner that the fuel amount "TCYL" agrees with the required fuel amount.

From the above-described definition, the required fuel amount "TCYL" from the cylinder 1, the downstream adhesion amount "TWPL" used for the next calculation, the upstream adhesion amount "TWPU" used for the next calculation, and the downstream fuel amount "TinTH" are calculated by the following equations:

$$TCYL = (AFW \times TinTH) + (BFW \times TWPL) \quad \text{(Equation 1)}$$

$$TWPL = [(1-AFW) \times TinTH] + [(1-BFW) \times TWPL] \quad \text{(Equation 2)}$$

$$TWPU = (1-RLU) \times (1-CFW) \times Tin(TOTAL) + (1-CFW) \times TWPU \quad \text{(Equation 3)}$$

$$TinTH = Tin(TOTAL) \times RLU + CFW \times (1-RLU) \times Tin(TOTAL) + DFW \times TWPU \quad \text{(Equation 4)}$$

A block diagram corresponding to Equations 1 to 4 is shown in FIG. 4. On the basis of the block diagram shown in FIG. 4, a block diagram indicating a calculation function for calculating the total injection amount Tin(TOTAL) so as to accurately supply the required fuel amount "TCYL" without underflow and overflow can be shown in FIG. 5.

A control model for adding an acceleration correction in order to ensure drivability in a transient state will be described hereinafter. In this control model, a required fuel amount containing no acceleration correction is defined as "TCYL(MAP)," and a required fuel amount containing an acceleration correction is defined as "TCYL(TACC)." The required fuel amount TCYL(TACC) is obtained by adding an acceleration correction amount TACC to the required fuel amount TCYL(MAP).

Here, a fuel amount supplied from the upstream injection valve 10 into the cylinder 1 contributes to a fuel injection amount obtained by subtracting a fuel supplied at the downstream injection ratio RLU from the required fuel amount TCYL(MAP) containing no acceleration correction amount. A fuel amount supplied from the downstream injection valve 10a in the cylinder 1 is equivalent to a fuel injection amount obtained by subtracting the above-described contributed fuel amount supplied from the upstream injection valve 10 from the required fuel amount TCYL(TACC) containing an acceleration correction amount.

The fuel amount TinTH(MAP), which must be present in the downstream of the throttle valve 9 to meet the required fuel amount TCYL(MAP) containing no acceleration correction amount, is expressed by the following equation:

$$TinTH(MAP) = [(TCYL(MAP) - BFW \times TWPL)/AFW] \quad \text{(Equation 5)}$$

The fuel amount TinTH(MAP) has a relationship with the amounts to be injected from the upstream and downstream injection vales 10 and 10a, as expressed by the following equation:

$$TinTH(MAP) = [(Tin(TOTAL) \times RLU) + (CFW \times (1-RLU) \times Tin(TOTAL)) + (DFW \times TWPU)] \quad \text{(Equation 6)}$$

From Equations 5 and 6, the total injection amount Tin(TOTAL) is expressed by the following equation:

$$Tin(TOTAL) = [((TCYL(MAP) - BFW \times TWPL)/AFW) - ((DFW \times TWPU)/(RLU + ((1-RLU) \times CFW)))] \quad \text{(Equation 7)}$$

From Equation 7, the upstream injection amount Tin(Upper) is expressed by the following equation:

$$Tin(Upper) = (1-RLU)/[RLU + (1-RLU)CFW] + [(1/AFW)(TCYL(MAP) - BFW \times TWPL) - DFW \times TWPU] \quad \text{(Equation 8)}$$

The downstream injection amount is calculated as follows. First, the fuel amount TinTH(TACC), which must be present in the downstream of the throttle valve 9 to meet the required fuel amount TCYL(TACC) containing an acceleration correction amount is expressed by the following equation:

$$TinTH(TACC) = (TCYL(TACC) - BFW \times TWPL)/AFW \quad \text{(Equation 9)}$$

Of the fuel present in the upstream of the throttle valve 9, the amount TinTH(Upper) of a fuel flowing in the downstream of the throttle valve 9 is expressed by the following equation:

$$TinTH(Upper) = CFW \times Tin(Upper) + DFW \times TWPU \quad \text{(Equation 10)}$$

From Equations 9 and 10, the downstream injection amount Tin(Lower) is expressed by the following equation:

$$Tin(Lower) = TinTH(TACC) - TinTH(Upper) = (TCYL(MAP) - BFW \times TWPL)/AFW - (CFW \times Tin(Upper) + DFW \times TWPU) \quad \text{(Equation 11)}$$

If the injection amount to be injected from the upstream injection valve 10 per unit time is different from that to be injected from the downstream injection valve 10a per unit time, then a ratio of the fuel injection amount to be injected from the upstream injection valve 10 to the fuel injection amount to be injected from the downstream injection valve 10a is previously set, and a fuel injection time for each of the upstream and downstream injection valves 10 and 10a is calculated in accordance with the fuel injection ratio. A fuel injection amount ratio KTin(Upper) can be tabled as a function of the upstream injection amount Tin(Upper). One example of a relationship between the fuel injection amount ratio KTin(Upper) and the upstream injection amount Tin(Upper) is shown in FIG. 6.

An injection time Tout(Upper) of the upstream injection valve 10 is calculated by the following equation:

$$Tout(Upper) = Tin(Upper) \times KTin(Upper) + TiVB(Upper) \quad \text{(Equation 12)}$$

In this equation, TiVB(Upper) designates an unavailable injection time of the upstream injection valve 10. An injection time Tout(Lower) of the downstream injection valve 10a is calculated by the following equation:

$$Tout(Lower)=Tin(Lower)+TiVB(Lower) \quad \text{(Equation 13)}$$

In this equation, TiVB(Lower) designates an unavailable injection time of the downstream injection valve 10a. Of the fuel having adhered on the upstream wall surface (upstream adhesion amount TWPU) and the fuel having adhered on the downstream wall surface (downstream adhesion amount TWPL), the downstream adhesion amount TWPL and the upstream adhesion amount TWPU used for the next cycle are calculated in consideration of fuels carried away by this cycle and fuels newly adhered by this cycle.

First, from Equation 2, the downstream adhesion amount TWPL left as adhered for the next cycle is calculated by the following equation:

$$\text{Next time } TWPL=(1-RLU)\times TinTH(TACC)+ (1-BFW)\times TWPL \quad \text{(Equation 14)}$$

Since the injection by the upstream injection valve 10 contains no acceleration correction amount, the upstream adhesion amount TWPU left as adhered for the next cycle is calculated from Equation 3 as follows;

$$\text{Next time } TWPU=(1-RLU)\times(1-CFW)\times Tin(TOTAL)+(1-CFW)\times TWPU \quad \text{(Equation 15)}$$

In the case of carrying out the fuel injection control on the basis of the above-described control model, it may be preferred to supply a fuel in accordance with a rapid change in engine state, for example, a large change in throttle opening angle. For this reason, a state in which a fuel injected from the upstream injection valve 10 flows downstream of the throttle valve 9 is monitored at each crank angle of 90°, and a lack of fuel is corrected by the downstream injection valve 10a in accordance with the current engine state.

As described above, a fuel flowing downstream of the throttle valve 9 includes a fuel injected from the upstream injection valve 10 to directly flow downstream of the throttle valve 9 and a fuel released from the wall surface to indirectly flow downstream of the throttle valve 9. The direct flow-in fuel is supplied downstream of the throttle valve 9 during a fuel injection period, and the indirect flow-in fuel is supplied downstream of the throttle valve 9 in an intake stroke in which an intake negative pressure develops/occurs.

If a throttle opening angle is changed during any one cycle, then the suction state is correspondingly changed. Accordingly, the amount of fuel flowing from the upstream region of the throttle valve into the downstream region of the throttle valve 9 is changed. A fuel flowing from the upstream region into the downstream region of the throttle valve 9 during one cycle is estimated on the basis of the direct flow-in fuel and the indirect flow-in fuel. These flows are detected at each crank angle of 90° in a preferred embodiment. As a result, if the total of the direct flow-in fuel and the indirect flow-in fuel cannot meet the required fuel amount for each cylinder, then the lack of fuel is injected from the downstream injection valve 10a to obtain/correct the fuel delivered to the cylinder 1.

FIG. 10 is a timing chart of the control model according to a preferred embodiment embodiment. As shown in this figure, one cycle (crank angle: 720°) of the engine is divided into eight stages, so that control is performed on the basis of the eight stages of one cycle. The injection amount Tin (Upper) of the upstream injection valve 10 and the injection amount Tin(Lower) of the downstream injection valve 10a are calculated at each crank angle of 180°. On the basis of such a calculation result, fuel injection by each of the upstream and downstream injection valves 10 and 10a is performed once per cycle.

In actuality, results of the calculation of fuel injection amounts performed a plurality of times during one cycle, e.g., one corresponding to the optimum injection timing, are adopted in consideration of a calculated injection time and the like. In the example shown in FIG. 10, the result of calculation performed during stage 2 is adopted, and in the stage 3 (the next stage), fuel injection by each of the upstream and downstream injection valves 10 and 10a is initiated. The fuel injection ends in stage 5.

Of the fuel injected from the upstream injection valve 10, the direct flow-in fuel flows downstream of the throttle valve 9 within the fuel injection time, e.g. in a period elapsing from stage 3 to stage 5 (this period is referred to as "direct flow-in period"). The indirect flow-in fuel flows downstream of the throttle valve 9 during the intake stroke, e.g., in a period elapsing from stage 5 to stage 7 (this period is referred to as "indirect flow-in period").

The direct flow-in fuel and the indirect flow-in fuel are calculated for each stage. A fuel amount (direct flow-in amount) due to the direct flow-in fuel is defined by TinLUDn, and a fuel amount (indirect flow-in amount) due to the indirect flow-in fuel is defined by TinLUIDn, and are respectively expressed by the following equations:

$$TinLUDn=CFW\ n\times Tin\ n \quad \text{(Equation 16)}$$

$$TinLUIDn=DFWn/(\text{number of indirect flow-in stage})\times TWPU\ n-1 \quad \text{(Equation 17)}$$

In these equations, character "n" designates a stage number (the same is true for in the following equations). A time required for a fuel injected from the upstream injection valve 10 to reach the intake valve 5 is longer than a time required for a fuel injected from the downstream injection valve 10a to reach the intake valve 5. According to an embodiment, an amount of a fuel having passed through the throttle valve 9 in one cycle from the stage 6 in which fuel injection from the upstream injection valve 10 was ended to the next stage 5 is calculated as an amount of a fuel flowing from the upstream of the throttle valve 9 into the cylinder 1 in the intake stroke.

Since the fuel amount injected from the upstream injection valve 10 in stage 6 can be calculated, a lack of the fuel in stage 6 can be calculated. On the other hand, a fuel amount injected from the downstream injection valve 10a in one cycle from stage 0 after stage 6, during which fuel injection from the downstream injection valve 10a was ended, by two stages to stage 7 is calculated. Consequently, the fuel (upstream fuel TinLU) passing through the throttle valve 9 in one cycle is estimated as a total of the direct flow-in amount TinLUD n (n=6 5) and the indirect flow-in amount TinLUID n (n=6~5) in a period from stage 6 to stage 5.

The calculation of a fuel amount required for the cylinder 1 is preferably performed in the intake stroke or immediately before the intake stroke. If the elapsed time from calculation to actual fuel injection is delayed or long, then the fuel control does not adequately cope with a rapid change in engine state. Accordingly, on the basis of the result of calculation in the vicinity of the intake stroke, e.g., the result of calculation of the required fuel amount during stage 6, a lack of fuel supplied amount by the upstream injection valve 10 in one cycle is determined. An additional fuel injection from the downstream injection valve 10a is performed in accordance with the determined lack of fuel amount. An additional injection amount TiADDF is calculated by the following equation:

$$TiADDF = TinTH(TACC) - TinLU - Tin(Lower) = (TCYL\ (TACC) - BFW \times TWPL)/AFW - TinLU - Tin(Lower) \quad \text{(Equation 18)}$$

A fuel adhesion amount on the inner wall of the intake passage 8 in each of the upstream and the downstream of the throttle valve 9 for the next cycle is calculated by the following equation:

$$TWPU = TWPU\ 5 \quad \text{(Equation 19)}$$

$$TWPL = (1-AFW) \times TinTH(TACC) + (1-BFW) \times TWPL \quad \text{(Equation 20)}$$

The fuel injection control on the basis of the above-described control model will be described with reference to flow charts shown in FIGS. 7 and 8.

In step S1 shown in FIG. 7, it is determined whether the present time is a predetermined calculation timing. This determination is performed with a position of the crankshaft detected on the basis of detection signals from the crank angle sensor 19 and the cam angle sensor 25. As described above, the calculation timing arrives at each crank angle of 180°. If it is decided that the present time is a proper calculating timing, the process goes on to step S2 in which the engine speed Ne is read out. The engine speed Ne is detected on the basis of a detection signal from the crank angle sensor 19. In step S3, the throttle opening angle θTH is read out. In step S4, a changed amount DθTH from the throttle opening angle θTH in the previous calculation timing to the throttle opening angle θTH in this calculation timing is calculated.

In step S5, a basic injection amount TCYL0 is calculated. The basic injection amount TCYL0 is calculated on the basis of the engine speed Ne and the throttle opening angle θTH. In step S6, an acceleration correction amount TACC is calculated on the basis of the throttle opening angle changed amount DθTH. The basic injection amount TACYL0 can be obtained by retrieving a table in which a relationship among the basic injection amount TCYL0, the engine speed Ne, and the throttle opening angle θTH is previously set on the basis of experimental results and calculation results. Similarly, the acceleration correction amount TACC can be obtained by retrieving a table in which a relationship between the throttle opening angle changed amount DθTH and the acceleration correction amount TACC is previously set on the basis of experimental results and calculation results.

In step S7, correction terms are calculated on the basis of the atmospheric pressure sensor 26, the intake air temperature sensor 15, the water temperature sensor 22, and the like. A correction coefficient K is calculated on the basis of these correction terns. In step S8, the required fuel amount TCYL (MAP) without the acceleration correction amount TACC and the required fuel amount TCYL(TACC) containing the acceleration correction amount TACC are calculated. The required fuel amount TCYL(MAP) is calculated by multiplying the basic injection amount TCYL0 by the correction coefficient K. The required fuel amount TCYL(TACC) is calculated by adding the acceleration correction amount TACC to the fuel supplied amount TCYL(MAP) without any acceleration correction amount.

In step S9, the upstream injection amount Tin(Upper) and the downstream injection amount Tin(Lower) are calculated. These amounts are calculated on the basis of Equations 8 and 11. In step S10, the upstream side fuel injection time required for supplying the upstream injection amount Tin (Upper) and the downstream side fuel injection time required for supplying the downstream injection amount Tin(Lower) are calculated. Since the injection amount per unit time by the upstream injection valve 10 is generally different from that by the downstream injection valve 10a, in step S10, the fuel injection amount Tout(Upper) is calculated on the basis of Equation 12, and the fuel injection time Tout(Lower) is calculated on the basis of Equation 13.

In step S11, it is decided whether the present time is the injection timing for the upstream injection valve 10, and if YES, the process goes on to step S12 in which the upstream injection valve 10 is driven for the time calculated in step S10. In step S13, it is decided whether the present time is the injection timing of the downstream injection valve 10a, and if YES, the process goes on to step S14 in which the downstream injection valve 10a is driven for the time calculated in step S10.

In step S15 shown in FIG. 8, it is decided whether or not the present time is the upstream state monitoring timing. The upstream state monitoring timing is a timing set at each crank angle of 90° and is a timing at which a fuel passing through the throttle valve 9 is calculated. If the answer in step S15 is affirmative (YES), the process goes on to step S16 in which the direct flow-in amount TinLUD n is calculated on the basis of Equation 16. In step S17, the indirect flow-in amount TinLUID n is calculated on the basis of Equation 17. In step S18, an amount of a fuel adhered on the upstream wall surface by the present fuel injection, e.g., the upstream adhesion amount TWPU n is calculated and is stored for calculation at the next upstream state monitoring timing.

In step S19, it is decided whether or not the present time is the additional injection amount calculation timing. In step S20, the additional injection amount TiADDF is calculated on the basis of Equation 18. In step S21, an amount of a fuel adhered on the upstream wall surface by the present fuel injection, e.g., the upstream adhesion amount TWPU, is calculated on the basis of Equation 19 and is stored for calculation at the next time period (after an elapse of a crank angle of 180°).

In step S22, an amount of a fuel adhered on the downstream wall surface by the present fuel injection, e.g., the downstream adhesion amount TWPL, is calculated on the basis of Equation 20 and is stored for calculation at the next time (after an elapse of a crank angle of 180°). In step S23, a lack of the fuel is injected from the downstream injection valve 10a on the basis of the calculation in step S20.

A fuel required for the cylinder 1 (cylinder required fuel) determined in consideration of drivability and fuel consumption can be supplied by executing the above-described process for each cycle. It is to be noted that if the engine has a plurality of cylinders, the process of the present invention may be executed for each respective cylinder as required by the individual engine design.

Depending on a difference between environments in which the upstream and downstream injection valves 10 and 10a are disposed, a fuel pressure of the upstream injection valve 10 against a surrounding atmosphere may be different from that of the downstream injection valve 10a against the surrounding atmosphere. For example, a fuel pressure of the upstream injection valve 10 may be lower than that of the downstream injection valve 10a. In this case, more accurate fuel supply against the cylinder required fuel amount can be carried out by performing, in addition to the above-described control, correction in consideration of the difference in fuel pressure. Specifically, sensors for detecting fuel pressures of the upstream and downstream injection valves 10 and 10a are provided. The injection times of the upstream and downstream injection valves 10 and 10a are then corrected in accordance with outputs from the sensors. For example, the correction may be performed in such a manner that the injection time of the injection valve having a higher fuel pressure is set to be made shorter than the injection time of the injection valve having a lower fuel pressure.

FIG. 1 is a block diagram showing functions of portions of a fuel injection control system according to a preferred embodiment. In this figure, a direct flow-in fuel calculating unit 28 estimates part of a fuel injected from the upstream injection valve 10, e.g., this part of the fuel does not adhere on the inner wall of the intake pipe and directly flows in the downstream of the throttle valve 9. An indirect flow-in fuel calculating unit 29 estimates part of the fuel injected from the upstream injection valve 10, e.g. this part of the fuel has adhered on the inner wall of the intake pipe and is released therefrom to indirectly flow in the downstream of the throttle valve 9.

A downstream fuel calculating unit 30 calculates a total of the estimated fuel amounts calculated by the direct flow-in fuel calculating unit 28 and the indirect flow-in fuel calculating unit 29 and a fuel amount injected from the downstream injection valve 10*a*. A downstream indirect flow-in fuel calculating unit 31 estimates part of the total fuel calculated by the downstream fuel calculating unit 30, e.g., this part of the total fuel that has adhered on the inner wall of the intake pipe and is released therefrom to indirectly flow in the cylinder 1.

A downstream direct flow-in fuel calculating unit 32 estimates part of the total fuel calculated by the downstream fuel calculating unit 30, e.g., this part of the total fuel is obtained by subtracting the indirect flow-in fuel calculated by the downstream indirect flow-in fuel calculating unit 31 from the total fuel flow amount. The total fuel flow amount flows directly into the cylinder 1.

An adding unit 33 adds the fuel amounts calculated by the downstream direct flow-in fuel calculating unit 32 and the downstream indirect flow-in fuel calculating unit 31. A comparing unit 34 compares the result calculated by the adding unit 33, e.g., the total of the fuel estimated to flow in the cylinder 1 with a cylinder required fuel amount TCYL. If the required fuel amount TCYL is smaller, then the comparing unit 34 outputs an instruction to make the fuel injection times of the upstream and downstream injection valves 10 and 10*a* shorter. If the required fuel amount TCYL is larger, then the comparing unit 34 outputs an instruction to make the fuel injection times of the upstream and downstream injection valves 10 and 10*a* longer.

FIG. 9 is a block diagram showing a function of calculation of an additional injection amount. In this figure, a throttle passing-through fuel calculating unit 35 calculates the fuel amount TinLU passing through the throttle valve 9 during the intake stroke, e.g., the total of the direct flow-in amount TinLUD n (n=6 5) and the indirect flow-in amount TinLUID n (n=6 5) in the period elapsing from stage 6 to stage 5 on the basis of Equations 16 and 17. A downstream injection amount calculating unit 36 calculates the fuel injection amount Tin(Lower) of the downstream injection valve 10*a* by the function shown in FIG. 1.

A downstream fuel amount calculating unit 37 calculates the downstream fuel amount TinTH(TACC) by using the required fuel amount TCYL(TACC), the downstream direct ratio AFW and the downstream indirect ratio BFW, and the downstream adhesion amount TWPL on the basis of Equation 9. An additional injection amount calculating unit 38 calculates the additional injection amount TiADDF by using the throttle passing-through fuel amount TinLU, the downstream fuel amount TinTH(TACC), and the fuel injection amount Tin(Lower) by the downstream injection valve 10*a* on the basis of Equation 18.

According to this embodiment, the fuel injection amounts by the upstream and downstream injection valves 10 and 10*a* are calculated in consideration of portions of a fuel injected from the upstream injection valve 10, including portions of the fuel which have adhered on the inner wall of the intake pipe in the downstream of the throttle valve 9 and those portions that have released therefrom.

Specificallly, a portion of the fuel injected from the upstream injection valve 10, directly flowing into the engine, and a portion of the fuel injected from the upstream injection valve 10, indirectly flowing into the engine (deposited on the inner wall of the intake pipe in the upstream of the throttle valve 9 and subsequently released to indirectly flow into the engine), are added together. The added amount is taken as a first fuel amount.

Similarly, a portion of the fuel injected from the downstream injection valve 10*a*, directly flowing into the engine, and a portion of the fuel injected from the downstream injection valve 10*a*, indirectly flowing into the engine (deposited on the inner wall of the intake pipe in the downstream of the throttle valve 9 and subsequently released to indirectly flow into the engine) are added together. The added amount is taken as a second fuel amount. The fuel injection amounts of the upstream and downstream injection valves 10 and 10*a* are determined in such a manner that the total of the first and second fuel amounts meets the engine required fuel amount, e.g., the cylinder required fuel amount TCYL.

Although one fuel injection valve is provided in each of the upstream and downstream positions with respect to the throttle valve 9 in the foregoing embodiment, the present invention is not limited thereto, but can be suitably used for an engine in which at least one fuel injection valve is provided in each of the upstream and downstream of the throttle valve 9. Accordingly, more or less fuel injection valves can be added or subtracted as desired by the designer employing the present invention.

In this embodiment, the direct flow-in amount and the indirect flow-in amount of fuels injected from a plurality of fuel injection valves are estimated and an additional fuel injection amount is determined on the basis of the estimated result. However, a lack of fuel, e.g. a fuel deficit, is calculated for each of the plurality of fuel injection valves, and a fuel injection amount for each of the fuel injection valves may be determined.

In summary, according to an embodiment of the present invention, fuel injection control may be configured such that a portion of a fuel injected from a fuel injection valve but indirectly supplied to the cylinder, e.g. a portion of the fuel that has adhered on the inner wall of an intake pipe and subsequently released therefrom, is estimated in accordance with an adhesion ratio and a release ratio. This portion is calculated and/or determined on the basis of a value estimated cyclically, e.g. not a fixed value, that determines how much of the fuel injected from the fuel injection valve flows into the cylinder during the intake stroke. A lack of fuel amount, e.g. a fuel correction amount is added as necessary and calculated with the present invention.

From this viewpoint, the present invention is also applicable to a fuel injection control system for an engine including a single fuel injection valve for each cylinder by modifying the above-described embodiment.

The present invention allows accurate fuel supply, even in a transient state in which an engine state is rapidly changed, based on the required fuel amount with a result that it is also possible to improve drivability. Further, although a fuel supply amount tends to be set on the rich side in order to avoid degradation of drivability due to over-lean fuel mixtures, the present invention does not require fuel supply amounts to be set on the rich side, so that it is possible to improve fuel consumption.

The following supplemental legend of elements appearing in the accompanying drawings is provided hereinafter for convenience. FIG. 1 shows an 10: upstream injection valve; 28: direct flow-in fuel calculating unit; 29: indirect flow-in fuel calculating unit; 10a: downstream injection valve; 30: downstream fuel calculating unit; 31: downstream indirect flow-in fuel calculating unit; 32: downstream direct flow-in fuel calculating unit; 33: adding unit; and a 34: comparison unit.

FIG. 2 shows a 24: control unit; 2-1: intake air temperature signal; 2-2: negative pressure signal; 2-3: injection signal; 2-4: water temperature signal; 2-5: vehicle speed signal; 2-6: crank pulse; 2-7: cam pulse. FIG. 3 shows an 3-1: upstream injection valve; 3-2: throttle valve; and a 3-3: downstream injection valve. FIG. 6 shows a 6-1: injection amount ratio; and an 6-2: upstream injection amount.

FIG. 7 shows 7-1: Start; S1: "calculation timing?"; S2: Read out engine speed→Ne; S3: Read out throttle opening angle→θTH; S4: Read out throttle opening angle changed amount→DθTH; S5: Calculate basic injection amount→TCYL0; S6: Calculate acceleration correction amount→TACC; S7: Calculate correction terms from atmospheric pressure/intake air temperature/water temperature, etc.→K; S8: Calculate cylinder required fuel amount→TCYL(MAP)=TCYL0×K TCYL(TACC)=TCYL(MAP)+TACC; S9: Calculate upstream and downstream injection amount→Tin(Upper), Tin(Lower); S10: Calculate upstream and downstream injection times→Tout(Upper), Tout(Lower); S11: upstream injection timing?; S12: Perform upstream injection; S13: downstream injection timing?; S14: Perform downstream injection.

FIG. 8 shows S15: upstream state monitoring timing?; S16: Calculate direct flow-in fuel amount→TinLUD n; S17: Calculate indirect flow-in fuel amount→TinLUID n; S18: Calculate upstream adhesion amount→TWPU n; S19: additional injection amount calculating timing?; S20: Calculate additional injection amount→TiADDF; S21: Calculate upstream adhesion amount→next time TWPU; S22: Calculate downstream adhesion amount→next time TWPL; S23: Perform additional injection; and 8-1: return.

FIG. 9 shows a 35: throttle passing-through fuel calculating unit; 37: downstream fuel amount calculating unit; 36: downstream injection amount calculating unit; 38: additional injection amount calculating unit; and 10a: downstream injection valve. FIG. 10 shows an 10-1: intake valve opening period; 10-2: indirect flow-in period; 10-3: direct flow-in period; 10-4: stage No.; 10-5: calculation of injection amount; 10-6: drive of upstream injection valve; 10-7: drive of downstream injection valve; 10-8: calculation of direct flow-in fuel amount; 10-9: calculation of indirect flow-in fuel amount; 10-10: calculation of upstream adhesion amount; and 10-11: calculation of TiADDF.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel injection control system for an engine comprising:

a throttle valve;

at least one upstream injection valve being disposed in an upstream position with respect to the throttle valve;

at least one downstream injection valve being disposed in a downstream position with respect to the throttle valve;

means for calculating a required fuel amount for a predetermined calculation cycle and calculating actual fuel amounts to be injected during a fuel injection process from the upstream injection valve and the downstream injection valve on the basis of the required fuel amount; and means for calculating, after said fuel injection process, a lack of fuel amount immediately before recalculating a recalculated required fuel amount at the calculation cycle coming at the end of an intake stroke, said lack of fuel amount being calculated by subtracting said required and said actual fuel amounts from the recalculated required fuel amount.

2. The fuel injection control system for an engine according to claim 1, wherein the lack of fuel amount is injected from the downstream injection valve during the intake stroke.

3. The fuel injection control system for an engine according to claim 1, wherein said means for calculating the lack of fuel amount includes means for calculating a portion of a fuel injected from each of the upstream injection valve and the downstream injection valve, said portion of said fuel injected from each of the upstream and downstream injection valves adhering on an inner wall of an intake pipe and being released to be subsequently supplied to the engine.

4. The fuel injection control system for an engine according to claim 3, said means for calculating said portion of said fuel in accordance with a predetermined adhesion ratio and a predetermined release ratio.

5. The fuel injection control system for an engine according to claim 4, wherein said lack of fuel amount is equal to a difference obtained by subtracting actual fuel amounts to be injected by the upstream injection valve and the downstream injection valve and the fuel amounts released from the inner wall to be supplied to the engine from the required fuel amount.

6. A fuel injection control system for an engine according to claim 1, wherein said means for calculating the lack of fuel amount includes means for calculating a portion of a fuel injected from each of the upstream injection valve and the downstream injection valve, said portion of said fuel injected from each of the upstream and downstream injection valves adhering on an inner wall of an intake pipe and being released to be subsequently supplied to the engine; and second calculating means for adding the fuel amount calculated by said means for calculating said required fuel amount and said portion of the fuel adhering on the inner wall of the intake pipe in the downstream of the throttle valve into a combined flow flowing into the engine.

7. The fuel injection control system for an engine according to claim 6, wherein a difference obtained by subtracting the fuel amount calculated by said second calculating means from the required fuel amount is said lack of fuel amount.

8. A fuel injection control system for an engine according to claim 1, wherein said means for calculating the lack of fuel amount includes means for calculating a portion of a fuel injected from each of the upstream injection valve and the downstream injection valve, said portion of said fuel injected from each of the upstream and downstream injection valves adhering on an inner wall of an intake pipe and being released to be subsequently supplied to the engine; and second calculating means for adding the fuel amount calculated by said means for calculating said required fuel amount and said portion of the fuel adhering on the inner wall of the intake pipe in the downstream of the throttle valve into a combined flow flowing into the engine.

9. The fuel injection control system for an engine according to claim 8, wherein a difference obtained by subtracting the fuel amount calculated by said second calculating means from the required fuel amount is said lack of fuel amount.

10. A fuel injection control system for an engine including a fuel injection valve, said fuel injection control system comprising:

means for calculating a required fuel amount during a predetermined calculation cycle and for calculating a injected fuel amount to be injected from the fuel injection valve on the basis of the required fuel amount;

means for calculating, after a fuel injection of a fuel from the fuel injection valve on the basis of the calculated injected fuel amount, a lack of fuel amount immediately before a re-calculation of a required fuel amount during the calculation cycle at the end of an intake stroke, said lack of fuel amount being calculated by subtracting the calculated injected fuel amount from the re-calculated required fuel amount; said lack of fuel amount being additionally injected during the intake stroke; said lack of fuel injection amount being calculated by addition of a fuel injected from the fuel injection valve and deposited on an inner wall of an intake pipe to achieve a first amount, and subtracting a fuel released from the deposited fuel to flow into an engine cylinder from the first amount.

11. A method of calculating a fuel injection amount for a cylinder using the system of claim 1, said method comprising:

calculating a fuel injection amount of at least one of the upstream fuel injection valve and the downstream fuel injection valve according to a respective fuel pressure of said upstream fuel injection valve and said downstream fuel injection valve; and controlling a fuel injection time period to control said fuel injection amount.

12. A fuel injection control system for an engine comprising:

at least one engine cylinder;

a throttle valve;

at least one upstream injection valve being disposed in an upstream position with respect to the throttle valve;

at least one downstream injection valve being disposed in a downstream position with respect to the throttle valve;

a direct fuel flow calculating unit;

an indirect fuel flow calculating unit;

a downstream fuel calculating unit, said downstream fuel calculating unit outputting a combined fuel flow from the upstream position and said downstream injection valve;

a downstream direct fuel flow calculating unit;

a downstream indirect fuel flow calculating unit;

an adding unit, said adding unit outputting an actual fuel amount to said cylinder; and a comparison unit, said comparison unit calculating a lack of fuel amount immediately before recalculating a recalculated required fuel amount at a calculation cycle coming at the end of an intake stroke of said cylinder, said lack of fuel amount being calculated by subtracting a sum of a required fuel amount and said actual fuel amount from the recalculated required fuel amount.

13. A method of calculating a fuel injection amount for a cylinder using the system of claim 12, said method comprising:

calculating a fuel injection amount of at least one of the upstream fuel injection valve and the downstream fuel injection valve; and controlling a fuel injection time period to control said fuel injection amount.

14. The method according to claim 13, further comprising comparing said actual fuel amount to said cylinder from said adding unit with a cylinder required fuel amount.

15. The method according to claim 14, further comprising outputting a fuel injection reduction instruction from said comparison unit if the required fuel amount is smaller than the actual fuel amount.

16. The method according to claim 14, further comprising outputting a fuel injection increase instruction from said comparison unit if the required fuel amount is greater than the actual fuel amount.

* * * * *